(12) United States Patent
Beauprez et al.

(10) Patent No.: US 7,922,397 B2
(45) Date of Patent: Apr. 12, 2011

(54) BUMP STOP WITH CONTROLLED TORQUE AND SUSPENSION STRUT FOR VEHICLE STEERING WHEEL

(75) Inventors: Jean-Michel Beauprez, Clermont (FR); Fabien Corlet, Argonay (FR); Ludovic Saunier, Annecy (FR)

(73) Assignee: S.N.R. Roulements, Annecy (FR)

( * ) Notice: Subject to any disclaimer, the term of this patent is extended or adjusted under 35 U.S.C. 154(b) by 453 days.

(21) Appl. No.: 11/984,834

(22) Filed: Nov. 21, 2007

(65) Prior Publication Data

US 2008/0179160 A1      Jul. 31, 2008

(30) Foreign Application Priority Data

Nov. 22, 2006    (FR) ...................................... 06 10226

(51) Int. Cl.
*F16C 19/10* (2006.01)
*F16C 33/38* (2006.01)
(52) U.S. Cl. .................. 384/609; 384/606; 384/614
(58) Field of Classification Search ............. 384/697, 384/609, 614–615, 617, 606; 192/70, 98, 192/85.51; 29/898.07
See application file for complete search history.

(56) References Cited

U.S. PATENT DOCUMENTS

| | | | |
|---|---|---|---|
| 4,175,770 A | 11/1979 | Draisbach | |
| 4,497,523 A * | 2/1985 | Lederman | 384/615 |
| 4,948,272 A | 8/1990 | Stowe | |
| 5,113,988 A * | 5/1992 | Caron | 192/98 |
| 6,189,670 B1 * | 2/2001 | Ponson et al. | 192/85.51 |
| 6,267,512 B1 * | 7/2001 | Beghini et al. | 384/609 |
| 6,464,060 B1 * | 10/2002 | Ponson et al. | 192/98 |
| 6,558,043 B2 * | 5/2003 | Beghini et al. | 384/615 |
| 6,612,749 B2 * | 9/2003 | Arnault et al. | 384/607 |
| 6,684,997 B2 * | 2/2004 | Klopfer et al. | 192/98 |
| 6,702,085 B1 * | 3/2004 | Ponson | 192/98 |
| 6,736,381 B2 * | 5/2004 | Chesne | 267/220 |
| 6,814,496 B2 * | 11/2004 | Beghini et al. | 384/617 |
| 7,117,986 B2 * | 10/2006 | Thomire et al. | 384/617 |
| 7,811,005 B2 * | 10/2010 | Beghini et al. | 384/609 |
| 2003/0002764 A1 * | 1/2003 | Pflugner et al. | 384/609 |
| 2005/0008276 A1 * | 1/2005 | Beghini et al. | 384/609 |
| 2005/0011717 A1 * | 1/2005 | Arnault | 192/98 |
| 2005/0089255 A1 * | 4/2005 | Debrailly et al. | 384/609 |
| 2006/0011445 A1 * | 1/2006 | Bussit et al. | 192/91 A |

FOREIGN PATENT DOCUMENTS

| | | |
|---|---|---|
| EP | 0 561 704 A1 | 9/1993 |
| EP | 1 745 952 A | 1/2007 |
| FR | 2 457 410 A1 | 12/1980 |
| JP | 52011256 A * | 1/1977 |
| JP | 59-169824 A * | 9/1984 |
| WO | WO 2005/121578 A | 12/2005 |

* cited by examiner

*Primary Examiner* — Marcus Charles
(74) *Attorney, Agent, or Firm* — Arent Fox LLP

(57) ABSTRACT

A bump stop device comprises a bearing 20 provided with two bottom 22 and top 24 metal washers between which rolling bodies 26 are arranged. A friction ring 34 is fixed to the first of the bottom and top metal washers and rubs against the other metal washer in order to create a static frictional torque that is greater than that of the rolling bodies and, in practice, greater than 1 Nm. The friction ring 34 makes it possible to generate a controlled resisting torque that limits the transmission to the steering column of the torque generated when driving the vehicle on a convex road.

14 Claims, 2 Drawing Sheets

BUMP STOP WITH CONTROLLED TORQUE AND SUSPENSION STRUT FOR VEHICLE STEERING WHEEL

CROSS-REFERENCE TO RELATED APPLICATION

This application claims the priority of French Application No. 0610226, filed Nov. 22, 2006, the entire specification, claims and drawings of which are incorporated herewith by reference.

TECHNICAL FIELD OF THE INVENTION

The invention relates to a bump stop for a suspension strut of a vehicle steering wheel, in particular for a telescoping suspension strut of an automobile vehicle steering wheel.

PRIOR ART

Under certain conditions of use, in particular when the vehicle is designed for use on convex roads, the ideal frictionless bump stop continuously transmits a torque that needs to be corrected to the steering column, resulting in driving inconvenience for the driver and constant energy consumption due to the continuous activation of the steering power assistance.

Document U.S. Pat. No. 4,175,770 describes a MacPherson-type suspension strut in which the top stop is equipped with a needle-roller thrust bearing interposed between a bottom mount acting as a seat for the top end of a coil spring and a top mount for attachment to the superstructure of the vehicle. To dampen the vibrations from rotation transmitted to the steering wheel, a friction element is introduced between the bottom mount and the top mount so as to produce constant friction for the entire range of operation. This friction element consists of a bead formed on the bearing cage, made from a flexible plastic material. The bead is compressed between the bottom and top mounts and produces the desired friction.

The resisting torque generated by a device of this type is, however, too great and too inaccurate to be used with a view to correcting systematic banking as described previously. In particular, the fact that the friction bead rubs against two surfaces simultaneously makes its behaviour difficult to control, even more so given that no means allowing stable lubrication of the bead over time are provided. In addition, the fact that the ring and the cage are made as a single part requires the choice of an elastic material for the cage, which is not always desirable. Finally, the movement of the cage is impeded by the bead, which is not desirable and risks inducing harmful friction in the needle rollers.

SUMMARY OF THE INVENTION

The invention therefore aims to solve the disadvantages of the prior art, so as to provide a bump stop that is adapted to use on convex roads.

For this purpose, the invention relates to a suspension bump comprising:
 a fixed top element comprising a top track;
 a bottom element rotating in relation to the top element around a geometrical axis of rotation, the bottom element comprising a bottom track;
 rolling bodies arranged between the top and bottom tracks; and
 a friction ring fixed to the first of the top and bottom elements and rubbing against the other element in order to create a static frictional torque that is greater than the static frictional torque generated by the rolling bodies.

Under normal operating conditions, the resisting torque generated by the friction ring is determined by a single friction interface, and thus by a single coefficient of friction and a single geometry of the friction surface, between the friction ring and the second element. In these conditions, it is possible to control the resisting torque, which is to say, to create a relatively stable torque over time, which only varies slightly from one bearing to the next after leaving the plant. This resisting torque limits the transmission to the steering column of the torque generated when driving the vehicle on a convex road. In practice, the desired conditions of friction are provided with a static frictional torque in excess of 1 Nm (0.738 pounds-feet).

According to one embodiment, the friction ring comprises an elastic lip rubbing against the other element.

Advantageously, the ring can be fixed to the first element by clamping. The attachment of the ring to the first element is such that when a torque exceeding a predetermined value is applied by the other element on the lip, the ring begins to rotate in relation to the first element. This value is considerably greater than the static frictional torque between the friction ring and the other element, preferably by a factor of 5 or 10 or greater. Preferably, the attachment by clamping is an attachment by friction, made for example by an elastic lip of the friction ring rubbing against the other element. In this way a ring is produced which has a high coefficient of friction with the first element and a substantially lower coefficient with the second element.

If the conditions of use considerably modify the operation of the friction ring to the point where it generates a torque that exceeds the initially planned operating range, for example following the intrusion of a foreign body or a deformation of the bearing under excessive stress, the attachment by clamping acts as a torque limiter by allowing the ring to slide in relation to the first element. Operation in degraded mode is thus guaranteed, which makes it possible to continue driving until the repair can be performed.

According to one embodiment, the friction ring comprises a rigid annular frame, for example made from metal. This frame guarantees excellent control of the contact between the ring and the fixed and rotating elements, in particular when the ring comprises, as described above, one or several lips.

The bearing preferably also comprises a cage equipped with cavities for holding the rolling bodies, the cage being free in rotation in relation to the friction ring. In one particularly advantageous embodiment, the rolling bodies are balls, the cavities of the cage each comprising two opposing concave walls, each of the two walls being in the shape of a spherical cap with a radius R defining a centre with a distance from the opposite wall that is greater then R. This arrangement makes it possible to minimise the friction between the balls and the cage and thus to get rid of unnecessary torque which might be added to the resisting torque generated by the friction ring. The cage is preferably a separate part from the ring and not in contact with the latter, and therefore free to rotate in relation to the ring. The behaviour of the friction ring is therefore independent from that of the cage.

Preferably, the top element comprises a metal bearing washer on which the top track is formed, the bottom element comprises a metal bearing washer on which the bottom track is formed, the friction ring being fixed to the top washer of the first element and rubbing against the washer of the other element. In this way a compact subassembly is obtained which combines the friction ring with a bearing made up of washers, rolling bodies and possibly a cage, this subassembly being capable, where applicable, of being preassembled before the assembly of the other elements of the stop, thus allowing perfect control of the assembly dimensions.

According to another aspect of the invention, it relates to a bump stop bearing comprising:
a fixed top element comprising a top track;
a bottom element rotating in relation to the top element around a geometrical axis of rotation, the bottom element comprising a bottom track;
rolling bodies arranged between the top and bottom tracks;
a friction ring arranged between the bottom and top elements, the friction ring comprising a porous polymer die which contains a lubricant, the friction ring rubbing against the bottom and top elements so as to create a static frictional torque that is greater than the static frictional torque generated by the rolling bodies.

Thus, thanks to the presence of the lubricant, excellent control of the frictional torque is obtained, thanks to the controlled viscous friction between the ring and the fixed and mobile elements.

According to another aspect of the invention, it relates to a bump stop bearing comprising:
bottom and top metal washers defining an axis of rotation of the bearing;
rolling bodies arranged between the top and bottom metal washers; and
a friction ring comprising
a supporting lip clamped on the first of the bottom and top metal washers such as to create a frictional torque between the friction ring and the first element; and
an elastic lip rubbing against the other element so as to create a frictional torque between the elastic lip and the other element, the frictional torque between the friction ring and the first element being at least five times greater than the frictional torque between the friction ring and the second metal washer.

In this way a range of friction corresponding to frictional torques preferably comprised between 1 Nm and 10 Nm (0.738 to 7.38 pounds-feet) is obtained, which prevents the torque generated by driving on a convex road from being transmitted to the steering column.

According to another aspect of the invention, it relates to a bump stop bearing comprising:
bottom and top metal washers defining an axis of rotation of the bearing;
rolling bodies arranged between the top and bottom metal washers;
a friction ring fixed to the first of the bottom and top metal washers rubbing against the other metal washer so as to create a frictional torque between the friction ring and the other metal washer; and
a cage equipped with cavities for holding the rolling bodies, the cage being free to rotate in relation to the friction ring.

In this way a friction element that is independent from the cage and does not disrupt the rolling of the rolling bodies is defined, so that the resisting torque generated at the level of the bearing is essentially due to the ring.

Preferably, the rolling bodies are balls, the cavities of the cage each comprising two opposing concave walls, each of the two walls being in the shape of a spherical cap with a radius R defining a centre with a distance from the opposite wall that is greater then R, the balls having a radius that is less than R.

According to another aspect of the invention, it relates to a bump stop bearing comprising
a fixed top element comprising a top metal bearing washer;
a bottom element rotating in relation to the top element around a geometrical axis of rotation, the bottom element comprising a bottom metal bearing washer;
rolling bodies arranged between the tracks formed on the top and bottom metal washers; and
a friction ring fixed to the first of the top and bottom elements and in frictional contact with the other element in order to create a static frictional torque that is greater than 1 Nm between the friction ring and the other element.

According to another aspect of the invention, it relates to a bump stop comprising:
a fixed top element comprising a top track;
a bottom element rotating in relation to the top element around a geometrical axis of rotation, the bottom element comprising a bottom track;
rolling bodies arranged between the top and bottom tracks; and
a friction ring made up of a porous polymer die which contains a lubricant, the ring rubbing against the top element and/or the bottom element so as to create a static frictional torque greater than the static frictional torque generated by the rolling bodies during the rotation of the bottom element.

The lubricant contained in the porous polymer die guarantees perfectly controlled viscous friction. The friction ring can be fixed to one of the elements, but it can also be free or solidly attached to a positioning cage of the rolling bodies.

BRIEF DESCRIPTION OF THE FIGURES

Further advantages and characteristics will emerge more clearly from the following description of specific embodiments of the invention, provided as non-limiting examples, and shown in the appended drawings, wherein.

DETAILED DESCRIPTION OF AN EMBODIMENT

Figure 1:
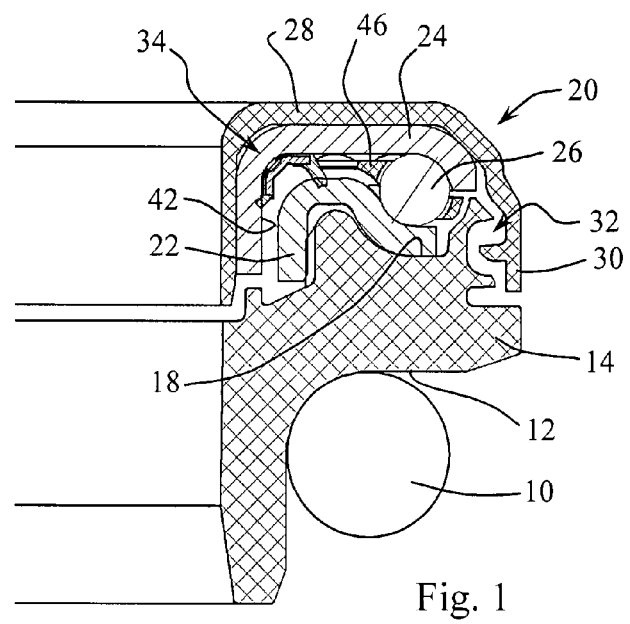
FIG. 1 shows, in an axial cross-section, a stop of a MacPherson strut according to one embodiment of the invention.

In reference to FIG. 1, a telescoping suspension strut comprises, in a known manner, a coil spring 10, a telescoping shock absorber and a shock-absorber buffer, not shown, these elements being arranged between a wheel and a bump stop 16 acting as an interface with the body of a vehicle. The spring comes to rest against the bottom annular wall 12 of a mount 14 made from a synthetic material, the top wall 18 of which acts as a seat for a roller bearing 20.

The bearing 20 consists of a bottom washer 22 and a top washer 24, both made from pressed steel and forming radial angular-contact raceways for rolling bodies such as balls 26. The bearing 20 thus defines an axis of rotation of the stop 16. The top washer 24 is supported on the bottom of a cover 28. The bottom washer 22 is supported on a support area forming a raised positioning pattern on the top surface 18 of the mount 14.

The cover 28 delimits with the mount 14 a housing for the bearing 20. The cover 28 is provided with a skirt 30 covering without contact a peripheral area of the mount 14 and thus delimiting an annular labyrinth 32 connecting the housing to the outside.

It should be noted that the washers 22, 24 forming the bearing 20 have considerable rigidity, which makes it possible to maintain very slight plays in terms of friction loss. These washers 22, 24 are preferably made from pressed sheet metal with a thickness of 1.2 to 2 mm.

Figure 2:
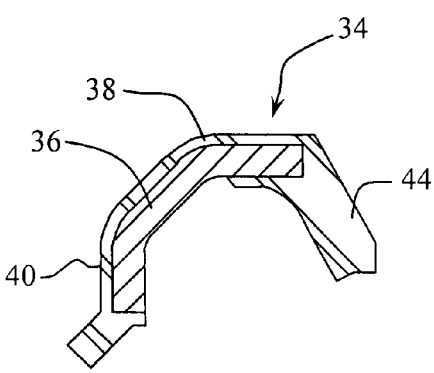
FIG. 2 shows an axial cross-section of a friction ring of the stop of FIG. 1.

A friction ring 34 is interposed between the two washers 22, 24. The ring, shown in detail in FIG. 2, comprises a metal frame 36 covered by an elastomer body 38. The annular metal frame 36 can be open or closed and guarantees the attachment of the ring 34 to the top washer 24 by clamping.

The elastomer body of the ring preferably includes a lip 40 which clamps a corresponding cylindrical face 42 of the top ring. The elastomer body 38 forms a friction lip 44 shaped substantially like a tapered cone, which projects axially and radially from the frame towards a substantially flat annular face of the bottom ring 22. The friction ring 34 is arranged radially inside the bearing 20.

Figure 3:
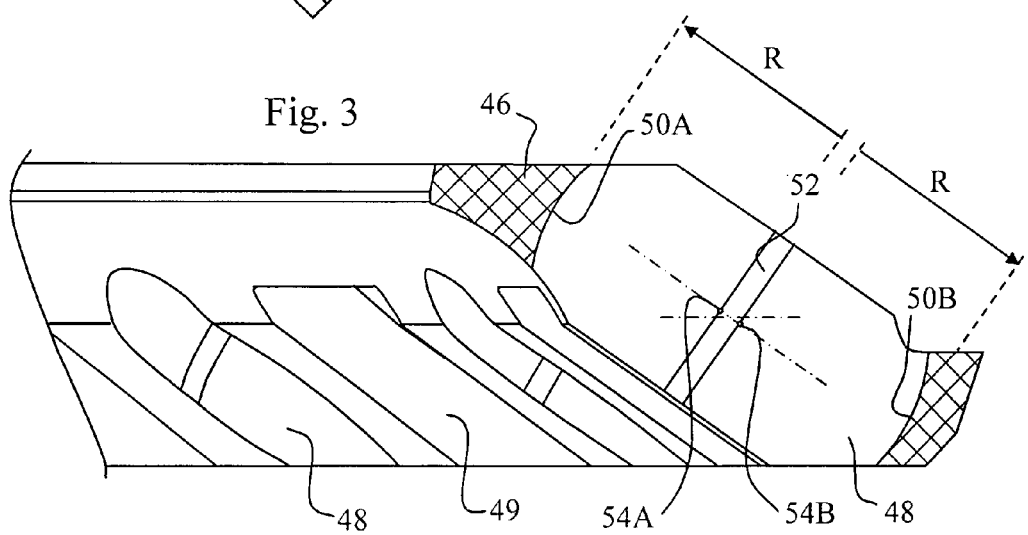
FIG. 3 shows a bearing cage used in the stop of FIG. 1.

The balls 26 of the bearing are positioned in relation to one another with the help of a cage 46 shown in detail in FIG. 3 and preferably made from a thermoplastic material. The cage comprises cavities 48 for housing the balls 26, separated from one another by recesses 49 that have the only function of limiting the mass and moment of inertia of the cage. Each cavity 48 is formed by two concave surfaces 50A, 50B shaped as spherical caps facing one another, connected by cylindrical connection surfaces 52.

The spherical caps 50A, 50B have the same radius R and each define a centre 54A, 54B. Remarkably, the two centres 54A, 54B thus defined for each cavity are separated from one another so as to be at a distance from the opposite surface which is greater than the radius R. It is thus understood that the balls, with a radius of less than R, have a considerable degree of positioning freedom. Typically, the ratio between the cage diameter and the ball diameter is approximately 1.02 to 1.2. This arrangement makes it possible considerably to reduce the frictional torque inside the bearing, which allows more precise control over the range of frictional torques produced by the device.

The main function of the friction ring 34 is to guarantee friction generating a controlled torque during the rotation of the bearing. In one example of application, the resisting torque must be greater than 1 Nm (Newton-metre), the torque generated by the rolling bodies being less than 1 Nm. In other examples of application, corresponding to directions of a different type, the minimum resisting torque must be 2, 3, or 10 Nm. The resisting torque referred to here is the torque required to start the rotation of the bearing from its neutral inactive position.

The specific configuration of the bearing cage 46 makes it possible to limit as far as possible the harmful influence of unwanted resisting torques. More specifically, the degree of freedom for positioning the balls 26 in the cavities 48 makes it possible to avoid any friction at this level, in particular wear appearing after intensive use. In practice, it is desirable for the resisting torque produced by the friction of the balls in the cages and by the bearing on the tracks to remain lower, preferably at least ten to five times lower, than the resisting torque generated by the friction ring. In this way it is guaranteed that the overall frictional torque of the bearing and of the friction ring remains below a top limit essentially determined by the actual friction ring.

Under certain conditions, in particular following the intrusion of a foreign body or a deformation of the bearing, the resisting torque between the friction ring and the bottom washer 22 can exceed the initially planned operating range. In a similar case, the attachment by clamping acts as a torque limiter by allowing the ring to slide in relation to the top washer 24. Operation in degraded mode is thus guaranteed, which makes it possible to continue driving until the stop is repaired or replaced.

Given its arrangement, the friction ring can have an additional function as a sealing lining.

Naturally, various modifications are possible. The lip can rub against a cylindrical surface, or with any rotational shape, of the bottom washer. The ring can be attached to the bottom washer and rub against the top lip. The ring can be attached by means other than clamping, for example by gluing. The rolling bodies can be rollers. The washers are not necessarily made by stamping and the term washer must be understood in its generic sense, without referring to a specific thickness, as relating to any annular body equipped with a track.

The friction ring is not necessarily arranged between the two washers and can, on the contrary, be arranged between any of the fixed elements and mobile elements of the stop.

Figure 4:
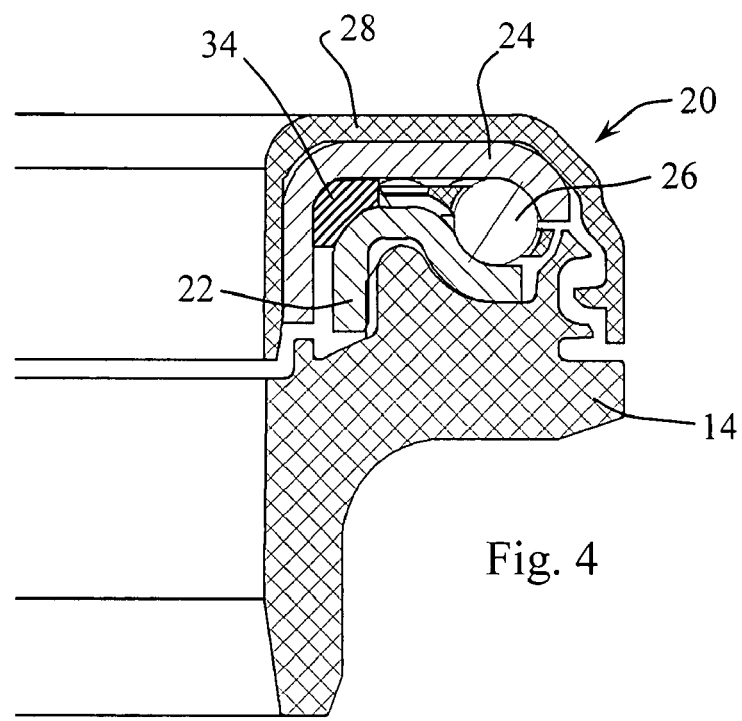
FIG. 4 shows, in an axial cross-section, a stop of a MacPherson strut according a second embodiment of the invention.

A second embodiment of the invention is shown in FIG. 4, where the previous used reference numbers are kept to refer to identical or similar parts. According to this embodiment, a friction ring 34 is interposed between the bottom washer 22 and the top washer 24 of the bearing 20, which furthermore comprises rolling bodies 26 made up in this example of balls. The ring 34 is formed by a porous polymer die which contains a lubricant. The die is made from a thermoplastic or thermosetting polymer mixed with a large amount of lubricant. The mix is then inserted in the space between the washers 22, 24 of the bearing and then interlaced, for example by heating, in order to ensure its rigidification. In this way a solid polymer die is formed which comprises pores containing the lubricant. The polymer can, for example, be polyethylene-based and the lubricant can be an oil, a grease or a mix of an oil and a grease. During the operation of the bearing, the porous die makes it possible to continuously supply lubricant to the interface between the friction ring 34 and the washers 22, 24 so as to obtain a controlled viscous friction. The lubricant is never expelled from the contact area to be lubricated, which guarantees great stability of the frictional characteristics over time. In this example of embodiment, the friction ring is not fixed in relation to one of the washers 22, 24. During the rotation of the bottom washer 22, the friction ring 34 rubs against each of the two washers 22, 24, in order overall to generate a static frictional torque of around 1 to 2 Nm which is added to the frictional torque generated by the rolling bodies in the tracks or in the cage.

Figure 5:
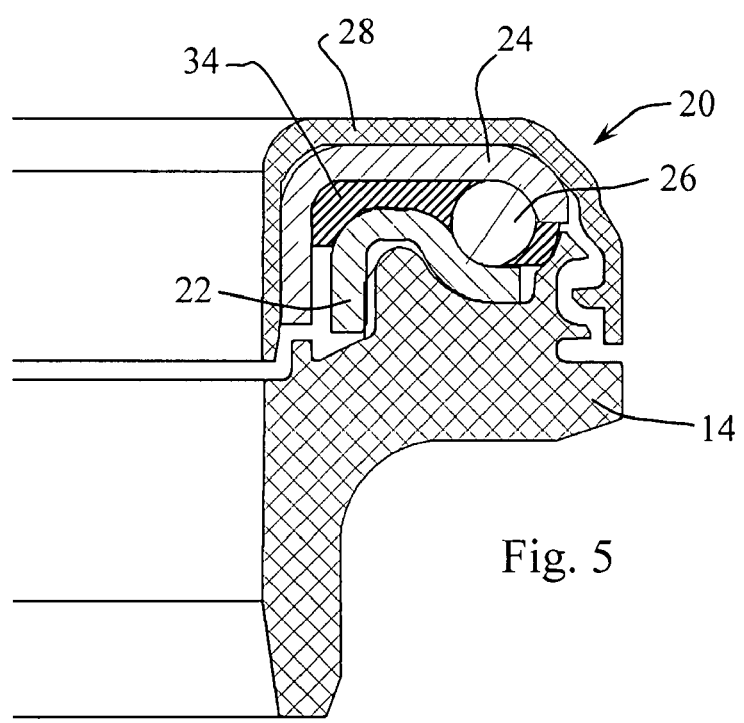
FIG. 5 shows an alternative embodiment of the embodiment of FIG. 4.

According to a variation of the preceding embodiment, shown in FIG. 5, the friction ring also forms a cage for guiding the rolling bodies. As above, the die is made from a thermoplastic or thermosetting polymer mixed with a large amount of lubricant. The mix is then inserted in the space between the rolling bodies 26 and between the washers 22, 24 and then interlaced, for example by heating, in order to ensure its rigidification. In this way, the rolling bodies 26 are held in the cavities of the friction ring. During the rotation of the bottom washer 22, the friction ring 34 rubs against each of the two washers 22, 24, in order overall to generate a static frictional torque of around 1 to 2 Nm which is added to the frictional torque generated by the rolling bodies 36 in the tracks or in the cavities of the friction ring 34.

A variation of the embodiment of FIG. 4 provides for rigidifying the ring with the help of a rigid frame, for example made from metal, surrounded by the porous die. It is also foreseeable to fix the ring to one of the washers.

The invention claimed is:

1. A bump stop comprising:
   a fixed top element comprising a top track formed on a top metal bearing washer;
   a bottom element rotating in relation to the top element around a geometrical axis of rotation, the bottom element comprising a bottom track formed on a bottom metal bearing washer;
   rolling bodies arranged between and in contact with the top and bottom tracks; and
   a friction ring directly fixed to the top metal bearing washer and rubbing against the bottom metal bearing washer in order to create a static frictional torque that is greater than the static frictional torque generated by the rolling bodies.

2. The bump stop according to claim 1, wherein the friction ring comprises an elastic lip rubbing against the bottom element.

3. The bump stop according to claim 1, wherein the friction ring is fixed to the first element by clamping.

4. The bump stop according to claim 3, wherein the attachment of the friction ring to the top element is such that when a torque exceeding a predetermined value is applied by the bottom element on the lip, the ring begins to rotate in relation to the top element, the predetermined value being more than five times the static frictional torque between the friction ring and the bottom element.

5. The bump stop according to claim 4, wherein the ring comprises a clamping lip clamped on the top element and providing the attachment of the friction ring on the top element by friction.

6. The bump stop according to claim 1, wherein the friction ring comprises a rigid annular frame.

7. The bump stop according to claim 1, also comprising a cage equipped with cavities for holding the rolling bodies, the cage being free to rotate in relation to the friction ring.

8. The bump stop according to claim 7, wherein the rolling bodies are balls, the cavities of the cage each comprising opposing concave walls, each of the two walls being in the shape of a spherical cap with a radius R defining a center with a distance from the opposite wall that is greater than R.

9. A bump stop bearing comprising:
   a fixed top element comprising a top metal bearing washer on which a top track is formed;
   a bottom element rotating in relation to the top element around a geometrical axis of rotation, the bottom element comprising a bottom metal bearing washer on which a bottom track is formed;
   rolling bodies arranged between and in contact with the top and bottom tracks; and
   a friction ring arranged between the bottom and top metal bearing washers, the friction ring comprising a porous polymer die which contains a lubricant, the friction ring rubbing against the bottom and top elements so as to create a static frictional torque that is greater than the static frictional torque generated by the rolling bodies.

10. A bump stop bearing comprising:
    bottom and top metal washers provided with bearing races and defining an axis of rotation of the bearing;
    rolling bodies arranged between the top and bottom metal washers and rolling on the bearing races; and
    a friction ring comprising:
      a supporting lip clamped on a first one of the bottom and top metal washers such as to create a frictional torque between the friction ring and the one of the bottom and top metal washers; and
      an elastic lip rubbing against the other of the bottom and top metal washers so as to create a frictional torque between the elastic lip and the other of the bottom and top metal washers, the frictional torque between the friction ring and the first one of the bottom and top metal washers element being at least five times greater than the frictional torque between the friction ring and the other of the bottom and top metal washers.

11. A bump stop bearing comprising:
    bottom and top metal washers defining an axis of rotation of the bearing;
    rolling bodies arranged between and in contact with the top and bottom metal washers;
    a friction ring fixed to a first one of the bottom and top metal washers and rubbing against the other of the bottom and top metal washers so as to create a frictional torque between the friction ring and the other of the bottom and top metal washers; and
    a cage equipped with cavities for holding the rolling bodies, the cage being free to rotate in relation to the friction ring.

12. The bump stop bearing according to claim 11, wherein the rolling bodies are balls, the cavities of the cage each comprising opposing concave walls, each of the two walls being in the shape of a spherical cap with a radius R defining a center with a distance from the opposite wall that is greater than R, the balls having a radius that is less than R.

13. A bump stop comprising
    a fixed top element comprising a top metal bearing washer provided with a top track;
    a bottom element rotating in relation to the top element around a geometrical axis of rotation, the bottom element comprising a bottom metal bearing washer provided with a bottom track;
    rolling bodies arranged between and in contact with the top and bottom tracks; and
    a friction ring fixed to a first one of the top and bottom elements and in frictional contact with the other of the top and bottom elements in order to create a static frictional torque that is greater than 1 Nm between the friction ring and the other of the top and bottom elements.

14. A bump stop comprising:
    a fixed top element comprising a top track;
    a bottom element rotating in relation to the top element around a geometrical axis of rotation, the bottom element comprising a bottom track;
    rolling bodies arranged between and in contact with the top and bottom tracks; and
    a friction ring made up of a porous polymer die which contains a lubricant, the ring rubbing against the top element and/or the bottom element so as to create a static frictional torque greater than the static frictional torque generated by the rolling bodies during the rotation of the bottom element.

* * * * *